(No Model.) 3 Sheets—Sheet 1.
W. H. H. TRACY.
SEWING MACHINE.
No. 498,331. Patented May 30, 1893.
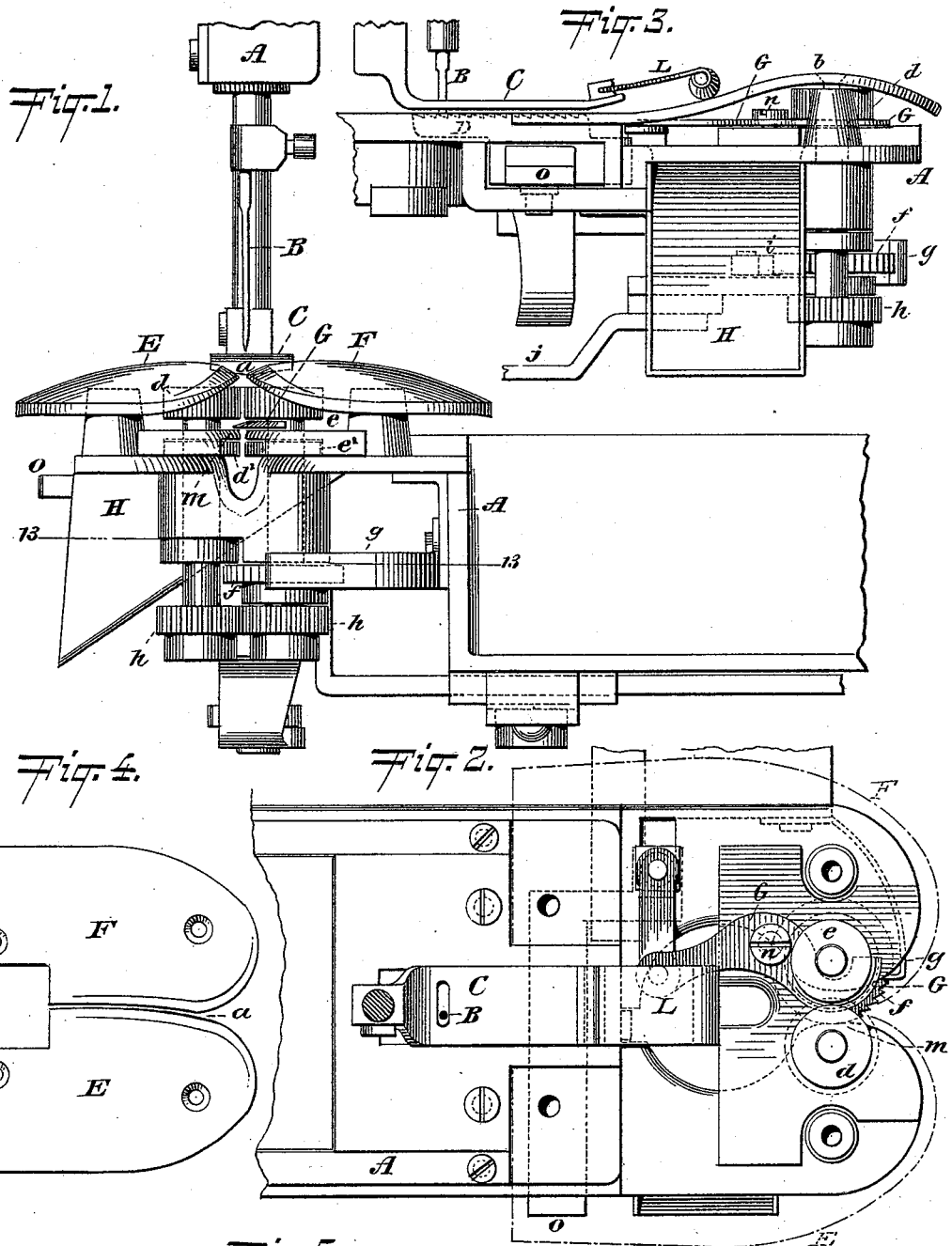

(No Model.)  W. H. H. TRACY.  3 Sheets—Sheet 2.
SEWING MACHINE.
No. 498,331.  Patented May 30, 1893.
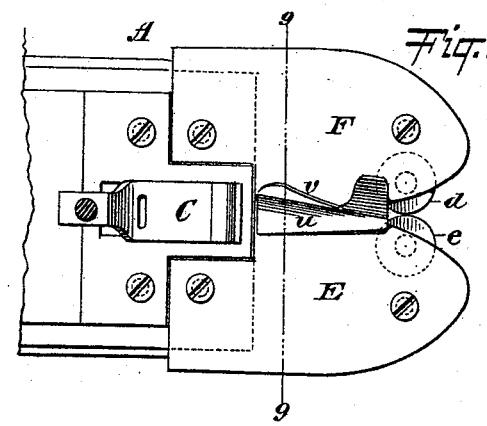
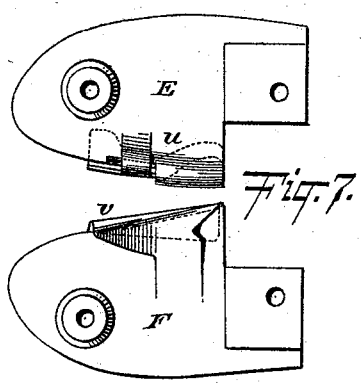
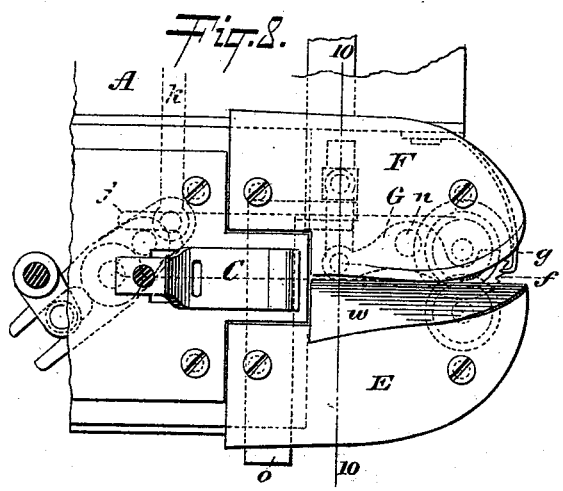
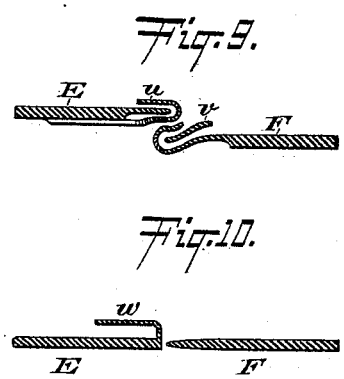
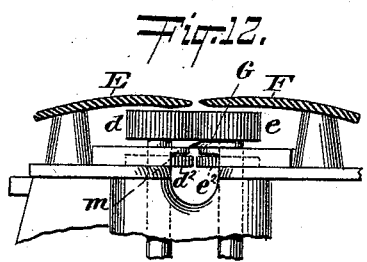
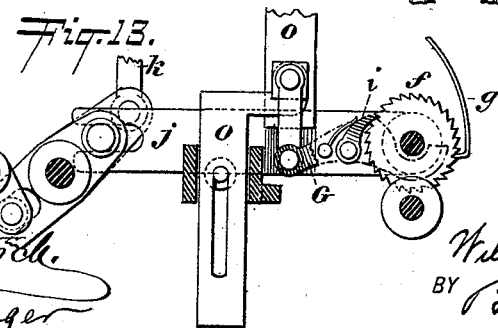
WITNESSES:
Gustave Dieterich
L. M. Wachschlager
INVENTOR:
William H. H. Tracy
BY Briesen & Knauth
his ATTORNEYS.

(No Model.) 3 Sheets—Sheet 3.
W. H. H. TRACY.
SEWING MACHINE.
No. 498,331. Patented May 30, 1893.
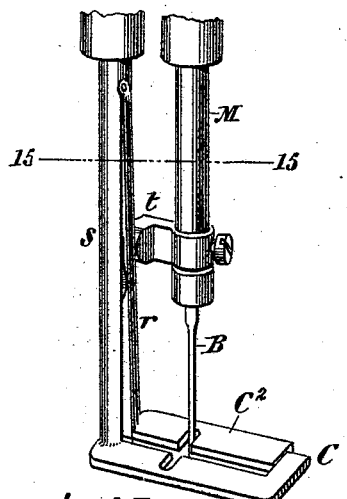
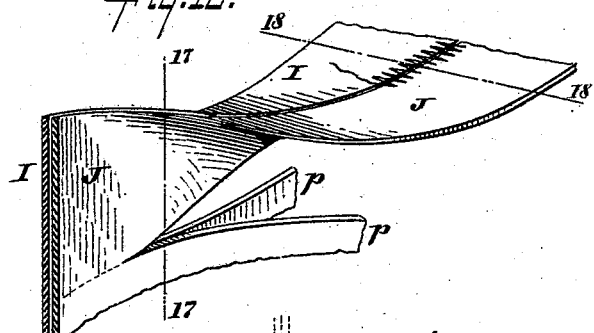
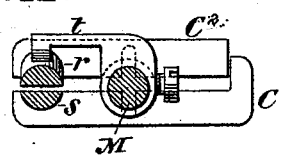
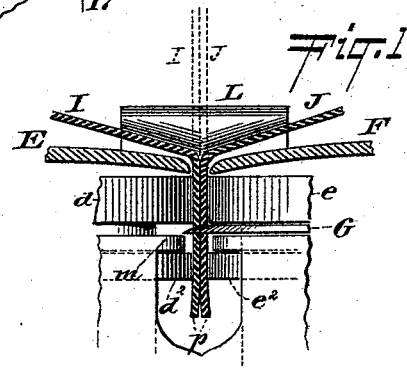
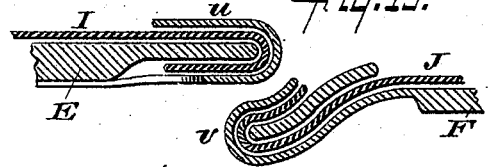
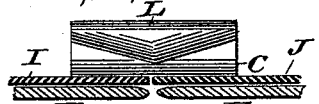
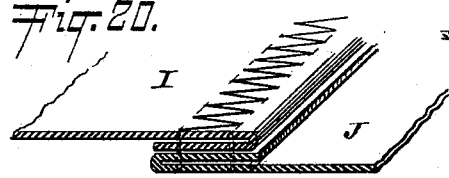
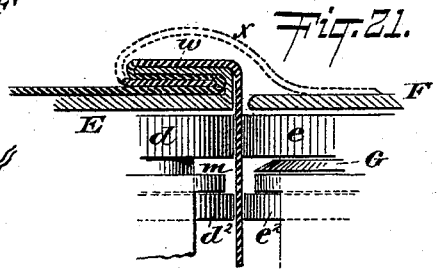
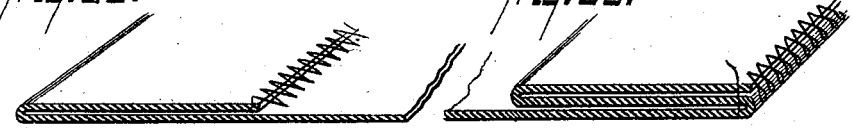
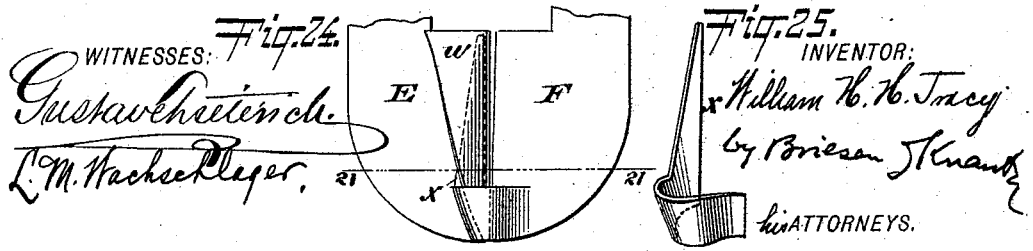
WITNESSES:
Gustave Dieterich
L. M. Wachsedlager
INVENTOR:
William H. H. Tracy
by Briesen & Knauth
his ATTORNEYS.
THE NORRIS PETERS CO., PHOTO-LITHO., WASHINGTON, D. C.

UNITED STATES PATENT OFFICE.

WILLIAM H. H. TRACY, OF TROY, ASSIGNOR OF ONE-HALF TO JEREMIAH A. SCRIVEN, OF NEW YORK, N. Y.

SEWING-MACHINE.

SPECIFICATION forming part of Letters Patent No. 498,331, dated May 30, 1893.

Application filed June 8, 1892. Serial No. 435,940. (No model.)

*To all whom it may concern:*

Be it known that I, WILLIAM H. H. TRACY, residing at Troy, Rensselaer county, in the State of New York, have invented an Improved Sewing-Machine for Uniting and Stitching Fabrics, of which the following is a specification, reference being had to the accompanying drawings, forming part hereof, wherein—

Figure 1 is a front elevation of a sewing machine provided with my improvement. Fig. 2 is a plan or top view of the same, partly in horizontal section, the horizontal section going through the stem of the presser-foot. Fig. 3 is a side view of the same. Fig. 4 is a plan or top view of the divided or split plate used on the machine; and Fig. 5 is a perspective view of the deflector used on the presser-foot of the machine. Fig. 6 is a top view of the machine when provided with a plate for turning the edges of the fabrics to be united. Fig. 7 represents a bottom view of the plate shown in Fig. 6. Fig. 8 is a top view of another form of the invention, so far as the plate is concerned, showing it adapted for turning a hem on a single fabric. Fig. 9 is a vertical cross-section on the line 9—9, Fig. 6; and Fig. 10 a similar section on the line 10—10, Fig. 8. Fig. 11 is an inner edge view of the turning plate for making the hem which is shown in the lower part of Fig. 8. Fig. 12 is a partial front view of the machine, the same as Fig. 1, showing, however, the split plate in section. Fig. 13 is a detail horizontal section on the line 13—13, Fig. 1. Fig. 14 is a perspective view of a preferred form of presser-foot employed in my machine; Fig. 15 a detail horizontal section on the line 15—15, Fig. 14. Fig. 16 is a perspective view showing the form assumed by the fabrics that are fed into the split plate of the character shown in Figs. 1 and 4. Fig. 17 is a vertical cross-section through the fabrics while vertically placed against one another, the section being taken on the line 17—17, Fig. 16, Fig. 17 also showing the adjoining parts in section. Fig. 18 represents a similar section of the fabrics and adjoining parts where the abutting edges of the fabrics assume a substantially horizontal position, the line 18—18, Fig. 16, indicating the plane of section. Fig. 19 is an enlarged cross-section showing the folding of two fabrics to be stitched on the plates represented in Fig. 6, the section being also taken on line 9—9, Fig. 6. Fig. 20 represents a sectional view of the two fabrics shaped according to Fig. 19 after said fabrics have been stitched together. Fig. 21 is a cross-section on the line 10—10, Fig. 8, showing the manner of folding a single fabric for hemming it. Fig. 22 represents the fabric so folded after being stitched. Fig. 23 represents the same fabric after being unfolded, but stitched. Fig. 24 is a top view of an attachment which may be used in connection with the hem-folding contrivance which is represented in Fig. 8; and Fig. 25 is a detail perspective view of the attachment shown in Fig. 24.

This invention relates to improvements in sewing machines whereby two fabrics may be fed in and stitched together while lying edge to edge, as in the upper part of Fig. 16, and wherein also two fabrics may be stitched together one on top of the other, each provided with a fold before being stitched, as represented in Fig. 19, and whereby a single fabric may have a hem turned onto it and have that hem stitched, as in Fig. 23. In order to accomplish all these different functions with the aid of a single machine, my invention mainly consists in the employment in the organization claimed of a divided or split plate, being the plate on which the fabric is fed toward the presser-foot and needle. By means of the split in the plate I am enabled to introduce the fabric or fabrics to a greater or less extent at first in a vertical position, and afterward to get the fabric or fabrics into a horizontal position; and I am also enabled by the use of this split plate to employ a cutter or knife by means of which superfluous portions of the fabrics can be detached from the parts to be stitched before they reach the needle and the presser-foot; the same arrangement allowing me also to employ a double feed, namely, one which engages the vertical part of the fabric under the slit of the plate, and another the usual reciprocating feed under the presser-foot.

My invention consists of the various arrangements and combinations of parts that will be hereinafter more fully specified and that are pointed out in the claims.

Referring to the accompanying drawings, the letter A represents the framing of a suitable sewing machine, the illustration indicating a Singer sewing machine; but any other kind may be employed in connection with my improvements.

I desire to have it stated right here that nothing in this invention has reference to the mechanism employed for moving the needle, the presser-foot, the feed, or the shuttle; all these parts may be of well-known or suitable construction.

B is the needle moving up and down in the usual manner.

C is the presser-foot, which can be raised and lowered in the usual manner.

D is the usual reciprocating feed located under the presser-foot C and operating back and forward during the action of the machine in the well-known manner.

Forward of the presser-foot and needle extends what I call the divided or split plate, which is constructed of two separate parts E, F, both these parts being plates, as indicated more clearly in Fig. 4, which can be screwed upon the frame of the machine, and which leave a narrow slit $a$ between them for purposes to be hereinafter more clearly described.

Each part of the divided plate E F, when looked at from the side (see Fig. 3), will be found to be bulging, that is to say, to be lower where it approaches the feed D and presser-foot C than near the front end of the machine. This is for the purpose of enabling the vertical parts of the fabric to be reached by the cutter.

I have marked the raised portion of the bulging and split plate E F with the letter $b$. Beneath this elevated portion $b$ of the split plate E F, I have arranged a vertical feed composed of two grip-rollers $d, e$, to which intermittent rotary motion is imparted by a suitable pawl $i$ (Fig. 13) engaging a ratchet-wheel $f$ which is on the arbor of one of the feed-wheels $e$, said pawl being carried by an arm $j$ connecting with the rod $k$ moving the shuttle of the machine, or with any other of the movable parts of the mechanism.

I do not want to limit myself to the special mechanism for moving the ratchet-wheel $f$, for the reason that any skilled mechanic will be able to connect any of the moving parts of the machine with the ratchet-wheel so as to give it intermittent rotary motion. Of course the ratchet is provided with a detent $g$, which prevents the feed-rollers $d\ e$ turning backward. The shafts of the feed-rollers $d\ e$ are geared together as shown at $h$ so that as one is turned in one direction, the other turns in the opposite direction.

It will be observed from an inspection of Fig. 1 that the space between the two feed-rollers $d\ e$ is exactly below the slit $a$ of the plate E F, thereby enabling these feed-rollers to feed a fabric whose vertical parts are suspended between them forward through the slit of the plate E F. Close below these feed-rollers $d\ e$ I have placed a knife G, whose object it is to detach any superflous fabric which may be suspended from below said feed-rollers. This knife G moves, shear-like, over a stationary blade $m$ (see Fig. 12) and is oscillated around its pivotal connection $n$ (Fig. 8) with the frame of the machine by a rod $o$, which may be the same rod that imparts the usual motion to the ordinary feed D, or which may be any other moving part of the mechanism. Directly beneath these shear cutters G $m$ the shafts of the vertical feed-rollers $d\ e$ carry secondary scrap feed-rollers $d^2\ e^2$ whose object it is to feed the detached portions of fabric, or scrap, that are cut off by the knife G away into a chute H (Fig. 3), whence they issue at the side or bottom of the machine, as may be preferred.

As far as this machine has now been described, and assuming the split plate E F to be plain, as in Fig. 12, I am now able to describe its operation. I desire with the machine thus constituted to stitch two fabrics together that are abutting one against the other edge to edge, as in the upper part of Fig. 16. To this end I first introduce sufficient of the fabrics vertically between the feed-rollers $d\ e$ and scrap-feeds $d^2\ e^2$ into the slit $a$ of the plate E F. At the point where the feed $d\ e$ engages these vertical portions of the fabrics, the plate E F is higher than anywhere else, having the bulge or raised portion $b$, and from that point on it gradually lowers toward the feed D. As the vertical parts of the fabric are gripped by the rollers $d\ e$, the cutter G detaches therefrom all that portion which is not needed or which is in excess of the desired length; the scrap-feed $d^2\ e^2$ carrying the scrap off to the chute H. Fig. 16 shows the scrap at $p$ as it is being detached from the vertical portions of the adjoining fabrics, which are represented by the letters I and J. As the fabric, being now fed forward by the rollers $d\ e$, gradually emerges above the descending plate E F, it is folded flat upon said plate, one fabric on one part E, the other fabric on the other part F of the split plate. For the purpose of laying the fabric gradually flat upon the plate E F, the presser-foot C is used, and when the fabric has considerable width, and for obtaining the best results, I prefer to attach to the free end of the presser-foot a deflector L, which assists in laying the fabric gradually in the desired manner, until finally it rests flat upon the plate E F and enters beneath the flat or substantially flat lower side of the main presser-foot C. Fig. 5 represents a perspective view of this deflector L, showing that its contact surface is V-shaped so as to bring about the gradual laying of the fabric. This is also indicated in Fig. 17, whereas Fig. 18 shows the fabric fully flattened under the main presser-foot C. It follows that beneath the presser-foot C the two fabrics I and J abut edge to edge in the line of their motion toward the needle, and in this position they are stitched together by a sort of zigzag stitch, which is produced on the Singer mechanism or on analogous mechanism by lateral play of the needle, well-known, which mechanism for producing the zigzag stitch I do not deem it necessary here further to describe. It will be seen that the space or slit in the plate E F leads toward and is in exact alignment with the needle. In order to keep the two edges of these fabrics I J quite close together and in absolute contact, I prefer to employ a divided presser-foot such as is represented in Fig. 14; that is to say, I provide the ordinary vertically movable presser-foot C with a movable portion $C^2$ which is carried on a shank $r$ that is pivoted to the main shank $s$ of the main presser-foot, the needle-bar M having a cam-like projection $t$ that crowds the movable portion $C^2$ of the presser-foot toward the stationary portion whenever the needle descends. But when the needle rises the cam $t$ moves away and permits a spring which is interposed between the shanks $r$ and $s$ to lift the movable portion $C^2$ of the presser-foot off the fabric. The effect of this peculiar construction of presser-foot is that at every down stroke of the needle the movable portion of the presser-foot crowds one of the fabrics tight against the edge of the other so that where the needle enters, the two fabrics will be definitely held in absolute abutting contact.

I have described my improved machine with its split plate E F made quite plain on top, that is, without any edge turners thereon; but it is quite evident that my invention is applicable also and of very great use for stitching fabrics together whose edges are being automatically turned by the machine in manner indicated in Fig. 19; that is to say, I can apply to the part E of the divided or split plate an edge turner $u$ which turns the edge of the fabric I down and under, while to the part F of the split plate I can apply an edge turner $v$ which turns the fabric J up and over. These edge turners, as Fig. 6 clearly shows, begin the operation on the fabric and begin to turn the edges thereof, only after the fabric has left the feed-rollers $d\ e$—hence after the scrap has been detached by the cutter; and when, therefore, the parts of the fabrics to be turned over and under are no longer in the grip of the vertical feed. The fabrics turned in manner shown in Fig. 19 finally arrive under the presser-foot C folded in manner shown in Fig. 20, and can then be stitched together by zigzag or by any other kind of stitch. It is also clear that my invention is applicable, because of the split plate E F, for forming a hem on one single fabric, and stitching that hem. To this end it is only necessary to supply the part E of the split plate E F with a bending wing $w$ (see Figs. 8, 11, 10 and 21), in which the fabric will gradually be folded in manner indicated in Fig. 21, with the assistance of a blade $x$ that enters into the hollow of the wing $w$, but is carried by the part F of the plate, as more clearly indicated in Fig. 24. By this instrumentality, the fabric, being first trimmed to the proper extent by the cutter G, is folded into the form shown in Fig. 21, and then gradually fed along over the widening wing $w$ until its vertical part lies horizontally over that wing, so that finally the double fold indicated in Fig. 22 is produced; after which the fabric is stitched along the edge, as in Fig. 22, and when it has been stitched as there shown, it can finally be opened out to contain the hem that is clearly shown in Fig. 23. It will be seen that in order to enjoy the advantage of the double feed, namely, the vertical feed in front and the ordinary horizontal feed behind, it is essential that the plate E F be higher above the feed $d\ e$ than it is where it approaches the feed D; for otherwise, I would be unable to obtain the use of the cutter G which trims off the scrap from parts of the fabric that are then held vertically, but that are afterward to be brought into a horizontal position. I therefore lay great stress upon the bulging of the plate E F, as I do also upon the employment of the double feed, one vertical and the other horizontal, and upon the employment of the split plate E F in the slit of which the vertical part of the fabric is first held and out of the slit of which said vertical part of the fabric will be automatically drawn into a final horizontal position.

Having thus described my invention, what I claim, and desire to secure by Letters Patent, is—

1. A sewing machine having in combination with the reciprocating needle and means substantially as described for actuating the needle, of complemental mechanism for uniting the thicknesses of fabric to be joined, and a divided cloth plate E, F, the dividing slit extending from the edge of the machine in direction toward the needle opening, and in direct alignment therewith.

2. In a sewing machine, and in combination with mechanism for uniting the two thicknesses of fabric to be joined, of a divided cloth plate having an upwardly bulging portion in advance of the needle, the dividing slit extending from the edge of said plate to the needle opening and auxiliary feeding mechanism beneath the bulging portion of said cloth plate.

3. In a sewing machine, the combination of the presser foot C and its shank $s$ and means substantially as described for moving it vertically only, with the pivotal vibrating secondary presser-foot $C^2$, and means substantially as described for moving said vibrating presser-foot on its pivot and vertically, all as set forth.

4. The combination of the presser-foot C and its shank $s$ with the laterally movable presser-foot $C^2$ and its pivoted shank $r$, spring interposed between shanks $r$ and $s$, and with the needle bar M, having cam $t$, all as and for the purpose specified.

5. In a sewing machine having the ordinary horizontal feed D and suitable presser-foot and needle mechanism, the combination thereof with the split plate E F, whose slit extends in a line toward the needle, with the vertical feed $d\ e$ below said plate, as and for the purpose specified.

6. The combination of the needle of a sewing machine and the split plate E F whose slit extends in line with and toward said needle, with the vertical feed $d\ e$ below the same, a cutter mechanism G $m$, and mechanism substantially as described for operating the same, all as and for the purpose specified.

7. The combination in a sewing machine of the split plate E F with the vertical feed $d\ e$ below the same, cutter mechanism G $m$ below said vertical feed, and scrap-feed $d^2\ e^2$, as and for the purpose described.

8. The combination in a sewing machine of the split plate E F with the vertical feed $d\ e$ below the same, cutter mechanism G $m$ below said vertical feed, scrap-feed $d^2\ e^2$ and scrap-outlet H, as described.

9. In a sewing machine having divided or split plate E F, the combination thereof with the presser-foot C, and the deflector L thereon, said deflector being above the slit in the plate E F and in front of the presser-foot for the purpose of gradually spreading the fabrics before they enter beneath the presser-foot, substantially as described.

10. In a sewing machine, the combination of the split plate E F having bulging form as specified, with a front vertical feed, a rear horizontal feed, presser-foot above the horizontal feed, cutter below the vertical feed and instrumentalities substantially as described for turning the edge of the fabric from the vertical position in the slit of the plate E F into a horizontal position above said plate E F, all as described and for the purpose specified.

WILLIAM H. H. TRACY.

Witnesses:
HARRY M. TURK,
E. L. SHERMAN.